United States Patent [19]

Richardson et al.

[11] 4,120,984
[45] Oct. 17, 1978

[54] PROCESS FOR PREPARING FOOD IN THE PACKAGE

[75] Inventors: Donald G. Richardson, Shorewood; Richard G. Hans, Edina, both of Minn.

[73] Assignee: The Pillsbury Company, Minneapolis, Minn.

[21] Appl. No.: 736,039

[22] Filed: Oct. 27, 1976

[51] Int. Cl.[2] .................. B65B 25/16; B65B 25/22
[52] U.S. Cl. .................................. 426/412; 53/440; 426/128; 426/394; 426/396; 426/403
[58] Field of Search .............. 426/113, 114, 128, 131, 426/108, 119, 118, 414, 410, 412, 399, 401, 397, 403, 404; 53/22 R, 22 A, 22 B, 25

[56] References Cited

U.S. PATENT DOCUMENTS

| 2,858,220 | 10/1958 | Battiste | 426/128 X |
|---|---|---|---|
| 3,108,881 | 10/1963 | Shaw et al. | 426/412 |
| 3,185,579 | 5/1965 | Dehne | 426/412 |
| 3,393,077 | 7/1968 | Morgau | 426/410 |
| 3,542,568 | 11/1970 | Bouyer | 426/128 |
| 3,793,135 | 2/1974 | Monia | 426/119 X |
| 3,865,302 | 2/1975 | Kane | 426/396 |
| 3,891,779 | 6/1975 | Robinson et al. | 426/399 |
| 3,972,153 | 8/1976 | Kiellarson et al. | 426/399 X |
| 3,989,853 | 11/1976 | Forkner | 426/412 |
| 3,997,677 | 12/1976 | Hirsch et al. | 426/118 X |

FOREIGN PATENT DOCUMENTS

| 1,408,217 | 5/1964 | France | 426/118 |
|---|---|---|---|
| 953,523 | 3/1964 | United Kingdom | 426/128 |
| 1,271,892 | 4/1972 | United Kingdom | 426/128 |

OTHER PUBLICATIONS

Modern Packaging, May 1966, pp. 69, 118.
Baker's Weekly, Oct. 11, 1954, pp. 30–34.

Primary Examiner—Steven L. Weinstein
Attorney, Agent, or Firm—James V. Harmon; Michael D. Ellwein; Mart C. Matthews

[57] ABSTRACT

A process is disclosed for baking products within a package while insuring sterility therein and preventing damage to the product during the cooling step.

6 Claims, 5 Drawing Figures

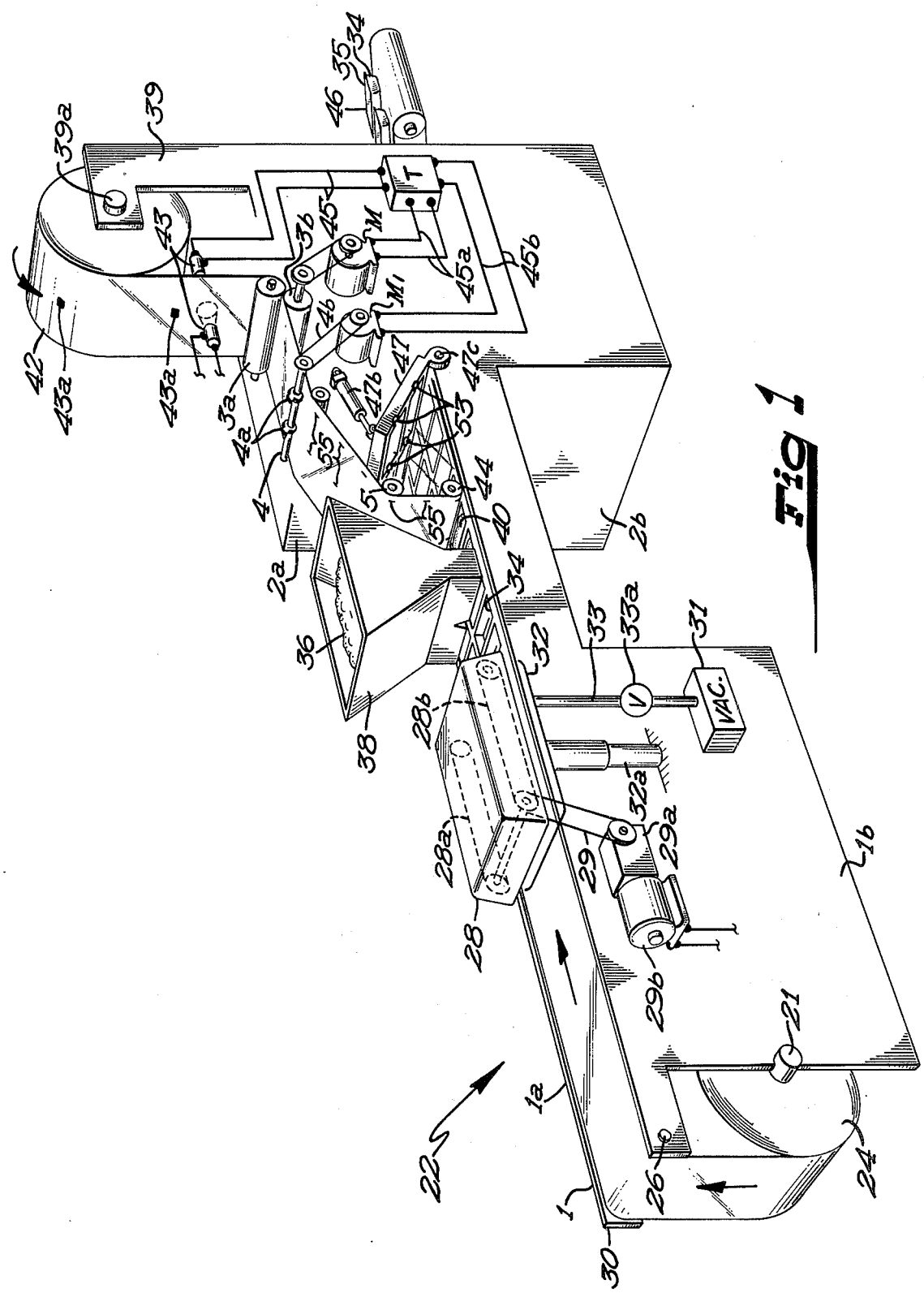

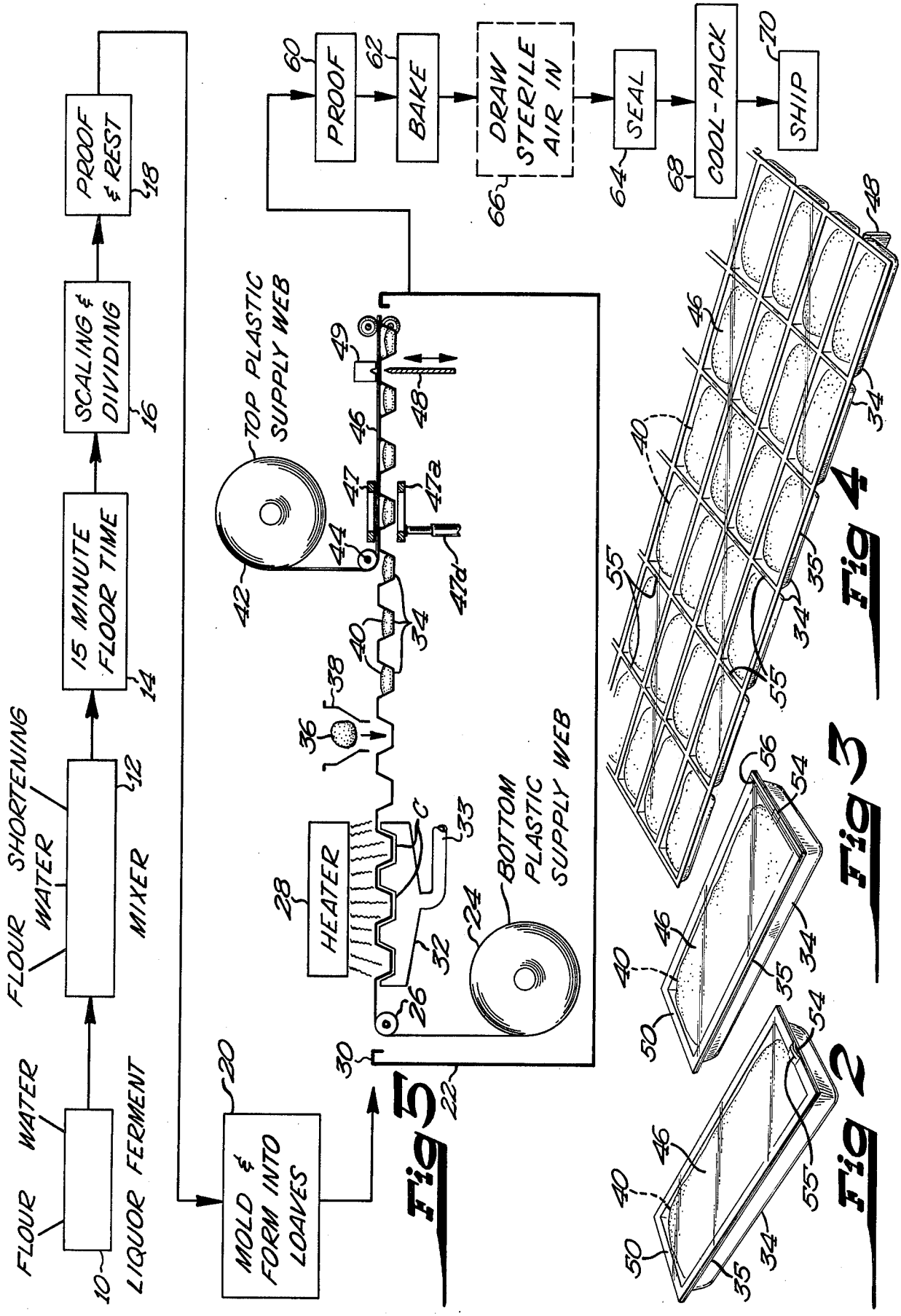

PROCESS FOR PREPARING FOOD IN THE PACKAGE

FIELD OF THE INVENTION

The invention relates to an apparatus and system for the packaging and preparing of foods.

THE PRIOR ART

The shelf life of fresh foods such as fresh baked goods now sold in supermarkets is limited to 3 or 4 days storage at room temperature primarily because of mold growth. Products now being distributed in a refrigerated condition will usually develop mold as evidenced by a green color on the surface within 40 days. At room temperature, the mold often develops on the surface of bakery goods for example, within about seven days. The present invention has as its general objective the provision of an apparatus and system that will eliminate this problem thereby allowing foods such as baked goods to be shipped refrigerated at 40° F. or 70° F. (i.e. room temperature) with no evidence of mold after 120 days of storage.

Previous apparatus and systems proposed for packaging and preparing bakery goods that are both a) sterile with respect to mold, and b) will not be contaminated during or after baking, have produced erratic results in that a small but significant number of failures occur, particularly where hand wrapping or other hand operations are required. Hand operations have also been slow, expensive and introduce an opportunity for either microbial contamination or packaging malformation.

The production of sterile or virtually sterile bakery goods and other foods has been carried out in both flexible or rigid containers. Pound and spice cake has, for example, been supplied in ordinary tin cans. It has also been proposed to produce sterile bakery goods in flexible pouches formed from laminates of aluminum foil and plastic by filling the pouch with dough or batter, placing it in water filled retort and heating it until sterile while the external pressure is controlled to prevent the pouch from bursting or from being collapsed by excessive external pressure. It has also been proposed to place dough in a tray or pouch of flexible material which is transferred into boiling water through an inlet water leg and removed through an outlet water leg to control the externally applied pressure during cooking. A disadvantage in these processes is that ordinary baking ovens cannot be used.

It has also been proposed in the past to bake bread that resists spoilage in ordinary baking ovens by manually wrapping dough in a sheet of moisture proof paper, baking the dough in the wrapper and hand sealing the wrapper after baking. This process is complicated, time consuming and requires a substantial amount of manual handling which is not only objectionable because of its cost and the special training required, but it also provides an additional opportunity for bacterial and fungal contamination of the dough surface due to the finger contact.

The term "sterile" as used herein means containing no viable mold spores. The expression "bakery goods" means having a content of a farinaceous food, e.g. bread or cake, cookies, etc., with or without a filling such as fruit, sauce, meat or the like.

OBJECTS

The major objects of the invention are to provide an apparatus and system for forming a package of sterile bakery goods which a) can be kept in a wholesome condition for 120 days without the formation of mold, b) exhibits good flavor and texture after 120 days of storage at either refrigerated or room temperature when warmed in a baking oven, c) is relatively inexpensive to operate and can utilize ordinary baking ovens, that is to say an electric, gas or oil fired hot air oven, d) has means for preventing contact between the dough and portions of the package where the dough is likely to stick, e) employs a package or container that is relatively inexpensive, light in weight and allows the food product to be seen clearly, f) allows accomplishment of the above objectives without preservatives in the dough, g) provides a loaf of bread or other bakery goods that exhibit good keeping qualities in the home so that the package can be kept on the shelf in the kitchen for several days or weeks and can be distributed by a bakery from a single location through the entire country, h) is capable of continuously producing filled packages that can be baked in large commercial size bakery band ovens three meters or more wide, i) is capable of packaging up to about 20,000 lbs. of dough ± 25% per hour, j) has provision for preventing the product from being crushed by vacuum after the package is sealed, and k) allows continuous mass production processing with no manual handling steps either for inserting the loaves in the packages, sealing them or advancing the packages from one location to another, l) is suited for use with a variety of bakery goods including bread, cake, cookies, crackers, rolls, biscuits, muffins, meat, jam or sauce filled bread and rolls or hamburgers and the like.

THE FIGURES

FIG. 1 is a perspective view of the apparatus.

FIG. 2 is a perspective view of a filled package in accordance with the invention prior to final sealing.

FIG. 3 is a view similar to FIG. 2 after the package is finally sealed.

FIG. 4 is a perspective view of a group of connected packages as they appear emerging from the oven prior to being cut apart.

FIG. 5 is a diagramatic flow chart showing the steps performed in one form of the invention.

SUMMARY OF THE INVENTION

According to the present invention an apparatus is provided that preferably comprises a plastic sheet heating and forming means such as a vacuum former to fold or mold the plastic sheet into trays. A food depositor or guide is located adjacent to the vacuum former to place food, e.g., dough in the trays. A sealer such as cooperating heated bars seal a sheet which is usually perforated over the top of each tray and an oven receives the filled trays and bakes the food within the trays. The oven can be an oil, electric or gas fired hot air baking oven. During the baking operation steam escapes through the perforations or vents which are then sealed. During operation, a food such as a flour containing dough or batter is placed in the tray or other suitable flexible package or recepticle. A flexible plastic pouch or tray is preferred. The pouch or covered tray has one or more steam vents at the time baking is carried out. During the baking operation, steam and gas escape through the vent which is sealed at the end of the baking operation.

The invention can be used with a variety of foods in addition to farinaceous foods. Among such foods are hash brown potato, au gratin potato and cooked meat. It can also be used with a variety of vegetables such as cooked corn, cooked carrots as well as hot dishes such as chicken with dumplings, macaroni and spaghetti with or without meat and other foods including hamburger sandwiches in which the meat patty has been cooked, fruit, etc. The invention is particularly useful with bakery goods since products of this kind have a particular shape such as the shape of a roll or loaf of bread, biscuit, muffin and so forth which must be retained up to the time that the product is to be eaten whereas creamed corn, chicken and dumplings, etc. can be formed into any shape and yet will provide an acceptable product. Thus, the advantage of the invention in protecting the delicate shape of bakery products and the like during packaging and cooking and distribution is one of the major advantages of the invention.

When the food is dough, the dough can be either yeast leavened or chemically leavened. Yeast leavened dough is typically composed of flour, water, yeast, sugar and shortening. Yeast leavened dough is compounded and mixed conventionally, preferably allowed to stand for a few minutes. It is then scaled and divided into bread size pieces and proofed. Batch or continuous processing can be used. The pouches can consist of one or more generally rectangular sheets bonded together at their edges. One or both of the sheets can be provided with a tray like trough or recess for holding the piece of dough, cake, cookies, etc. as the case may be.

In one preferred system or method of accomplishing the invention, packages are formed by continuously advancing a sheet of flexible package material, heating the film and periodically forming the heated portions of the film to provide a tray-like depression or recess. The dough pieces are then placed in the recesses and a second sheet of flexible packaging material is sealed over the top of the tray. One or more air vents is provided in the package preferably defined by an unsealed gap between the sealed edges. The dough is then proofed if necessary and heated in an oven at least sufficient to set the crumb structure of the dough. After heating the air vents are sealed either immediately or after a short cooling period. During the cooling period as steam condenses in the package, the package is allowed to inspire sterile air. The package is then sealed, cooled and shipped.

DESCRIPTION OF A PREFERRED EMBODIMENT

In the accomplishment of the foregoing and related advantages and objectives, this invention then comprises the features hereinafter fully described and particularly pointed out in the claims, the following description setting forth in detail certain illustrative embodiments of the invention these being indicative, however, of but a few of the various ways in which the principles of the invention may be employed.

The packing, forming, filling and sealing apparatus in accordance with the invention is indicated generally by numeral 1 in FIG. 1. It includes a supporting framework composed in part of parallel vertically disposed side plates 1a and 1b suitably joined together by internal frame members (not shown) and cross plates 2a and 2b, etc. some of which can be removed for inspection and cleaning etc.

The left end of the apparatus as seen in FIG. 1 is an arbor 21 which supports a plastic film or web 24 for rotation on the apparatus 1. From the roll the web material 24 is unwound traveling upwardly intermittently during operation over roll 26 which is journaled for rotation at the left end of the apparatus above the arbor 21. From roll 26 the web 24 travels across the top of the apparatus beneath a heater 28 which is capable of supplying sufficient heat to warm the web 24 to thermoforming temperature. Positioned adjacent to and on either side of the heater 28 are a pair of conveying bands 28a and 28b each entrained over parallel longitudinally and laterally spaced pulleys that are driven during operation by a drive belt 29 connected to intermittent drive 29a which is in turn driven by a drive motor 29b at the proper speed and direction to carry the web 24 intermittently from left to right beneath the heater 28 and remain there for just the proper amount of time to reach thermoforming temperature at which point motion is again imparted to the web 24 by the bands 28a to carry the then formed sheet toward the right to the filling station to be described below.

The web 24 when it becomes heated to the proper temperature is formed by a vacuum 31 which is applied to a vacuum forming cavity 32 through a line 33 under the control of a vacuum valve 33a. The vacuum cavity 32 includes a plurality of longitudinally and laterally spaced upwardly opening recesses having inclined centrally tapered sidewalls. The recesses or cavities are designated C in FIG. 5. The apparatus includes suitable provision (not shown) such as timing means or limit switch for turning on vacuum 31 by opening valve 33a when the web 24 has been stopped by the intermittent drive 29a for sufficient time to reach thermoforming temperature. The vacuum present in cavity 32 then draws the web 24 downwardly into the upwardly opening cavities C thereby forming the web into a plurality of usually laterally spaced as well as longitudinally spaced pouch portions or trays 34 that define the lower portion of the package being formed.

A cylinder or other equivalent means 32a supports the cavity 32 for upward and downward movement and after the web has been formed is suitably actuated preferably by electrical or pneumatic controls connected to vacuum valve 33a to lower the cavity 32 away from the web 34 so that the web can be advanced the required distance toward the right.

Positioned immediately to the right of the vacuum forming station is provided a tray filling station which includes a hopper 38 containing food such as dough 36 and having the proper number of openings at its lower end to feed the dough into the upwardly opening trays 34. The hopper 38 in most typical applications is not filled with the food product but functions merely as a guide or chute for directing the downward movement of preformed bodies of the food such as the dough balls 36 (FIG. 5). Once the dough ball or loaf 36 has dropped into the tray 34 it takes the position indicated at 40 and its upper surface is spaced somewhat below the upper edge of each tray.

The apparatus includes a pair of upwardly extending support arms 39, only one of which is shown, upon the upper end of which is journaled for rotation at 39a, a roll of a supply web 42 of a flexible packaging sheet material for the upper sheet or cover layer that defines the top of the finished package. During operation the web 42 is drawn intermittently downwardly past a lamp and photocell assembly 43 suitably positioned for sensing marks 43a imprinted on web 42 and connected via conductors 45 to a Timer which is in turn wired by means of conductors 45a and 45b to Motors M and M'. Motor M is suitably connected by a drive sprocket and chain assembly to one of a pair of drive rolls 3a and 3b which intermittently advance the web 42 toward the left in the Figures past a perforator 4 that comprises a pair of laterally spaced blade segments 4a each mounted upon a transversely extending shaft connected via suitable chain sprocket assembly 4b to motor M'. Thus, as the motor M' turns, the blades 4a will periodically produce cuts 55 at laterally spaced positions and at the proper distance longitudinally from one another on the web 42 so that each perforation or cut 55 is located in approximately the center of one end of each of the trays 34 as best seen in FIGS. 2 and 4.

From the perforator 4, the web 42 passes toward the left and downwardly, over idler rollers 5 and 44 and into abutting relationship with the peripheral flange between the freshly formed and filled columns and rows of trays 34.

After the top or cover comprising web 42 has been applied to the upper surface of the trays 34, the filled trays and web 42 pass intermittently toward the right to a sealing station including upper and lower heated sealing elements 47 and 47a respectively comprising longitudinal and transversely extending bars which coincide in position with the flat horizontal peripheral flanges 35 between trays 34. Thus, during operation the heat sealing elements 47, 47a are brought together for example under the influence of a cylinder actuator 47b which swings the upper heat sealing element 47 downwardly about a pivot 47c into contact with web 42 thereby forcing it firmly against the flange 35 of each tray 34, the latter being supported against downward movement by the bars 47a.

In order to allow the trays to move, the lower heat sealing member 47a is raised or lowered periodically by means of a hydraulic or pneumatic cylinder 47d (FIG. 5) which is operated in timed relationship with the operation and cylinder 47b.

The heat sealing elements 47 and 47a are provided with recesses or grooves 53 (FIG. 1) positioned to coincide with one end or side segment of the horizontal flange 35 to thereby provide an unsealed section 54 in the otherwise completely sealed tray for the escape of vapor and steam as will be described below. While it is not essential that the bars 47-47a be provided with grooves 53, it is important that some means be provided for forming the unsealed section 54 as shown in FIGS. 2 and 3. This could also be accomplished by having a portion of the heated element 47 be formed from an insulator material that is not heated. A slot or groove such as 53 is however, the most effective.

The filled and sealed packages are now ready for baking. It is preferred that baking be accomplished with at least some of the trays connected together. For example, a group of a dozen can be left connected together and baked as a unit. Each group can be separated from the next by means of a cutter comprising periodically operated cutting blade 48 and blade backing member 49 (FIG. 5). Following baking the columns and rows of trays which have been baked as a unit can be separated by suitable cutters (not shown).

While the invention is applicable to a wide variety of bakery goods as outlined above, it is particularly useful in connection with yeast or chemically leavened bread and rolls. Typical yeast leavened bread and roll formulas are as follows:

| Yeast Leavened Dough | | |
|---|---|---|
| Ingredients | Pan Roll Percent | Commercial Bread Percent |
| Flour, hard bleached | 53.1 | 54.5 |
| Water | 26.6 | 35.1 |
| Sucrose | 7.0 | 3.7 |
| Shortening, melted | | lard 1.6 |
| lard | 7.0 | monoglycerides .2 |
| NFDM | 2.3 | 1.6 |
| Egg albumon | .3 | 0.0 |
| Egg yolk | .5 | 0.0 |
| Yeast | 1.8 | 1.7 |
| Salt | 1.4 | .9 |
| Preservatives (calcium propionate) | 0.0 | .5 |
| | 100.0 | 100.0 |

Each of the above formulas is mixed for 15 minutes using a bar or sigma blade mixer. The dough temperature is 81° F. The dough finished is formed into ten ounce loaves.

To prepare a chemically leavened biscuit dough, the following formula can be used.

| Biscuit Dough Chemically Leavened | |
|---|---|
| Ingredients | Percent |
| 1st Stage | |
| Water | 32.9 |
| Ice | |
| Beef or vegetable Shortening | 3.0 |
| Flour, hard bleached | 56.9 |
| Flour enrichment | |
| Electrolytic, Micromized iron, vitamins | .009 |
| 2nd Stage | |
| Sodium Acid Pyrophosphate | 1.5 |
| Bicarbonate of Soda Powdered | 1.1 |
| Salt, medium fine (unfilled) | 1.3 |
| Corn Sugar (coarse) | 3.2 |
| | 100.0 |

The ingredients of stage 1 are placed in a sigma blade or bar mixer and mixed for about 4 minutes. The second stage ingredients are then added and mixing is continued for an additional 3 minutes. The dough is then sheeted to produce a sheet about ⅜ inch thick. This sheet is cut into biscuit size pieces which are placed in trays with eight ounces of dough to the tray.

While typical formulas have been set forth by way of example above, the invention will be described with particular reference to the forming of one pound loaves of yeast leavened bread. Referring now to FIG. 5, it will be seen that flour and water are slurred in a jacketed 50 gallon kettle 10 heated to 82° F. to 88° F. 90 percent of the water is introduced into kettle 10 together with 70 to 100 parts of flour by weight for each 100 parts of water as well as the yeast and yeast food. All proportions and numerical quantities herein are expressed on a weight basis. A small portion e.g., 10 percent of the water is withheld. Next, the yeast and yeast food are slurried in the water that was withheld. This slurry is then added to the kettle 10. For 3.5 hours the temperature of the kettle 10 is maintained at 82° F. to 88° F. to carry out liquor fermentation. The sponge is agitated once an hour. Next, chilled water or brine water is circulated through the jacket of the kettle until the temperature is lowered to 50° F. This takes approximately 30 minutes. The water circulation is continued as necessary to maintain the temperature at 50° F. To a 50 pound bar mixer 12 is added flour, non-fat dry milk, salt, egg yolk, egg albumen and sucrose.

The mixer 12 can be any commercially available bar or sigma blade mixer. Mixing is carried out for from 2 to about 15 minutes in the case of a yeast leavened bread dough. With the mixer running at 40 r.p.m., the sponge prepared in the kettle 10 is added. Mixing is continued for 1 minute at 40 r.p.m. Mixing is then continued at 80 r.p.m. for 5 minutes and mixing is stopped. The shortening is then added. The dough is mixed at 40 r.p.m. for 1 minute and finally, the 80 r.p.m. for 2 minutes or until the dough cleans up. The dough is then allowed to stand (block 14) for about 15 minutes. The dough is then scaled and divided as shown at 16. Next, the dough is allowed to proof and rest at 18 until it has approximately doubled in size.

The proofing and resting at 18 is carried out for a time depending upon the nature of the product being prepared until the volumn approximately doubles. Usually in the case of an ordinary bread loaf of 1½ pounds, 20 minutes is satisfactory. The dough pieces are then molded and formed into loaves at 20 in any conventional well known manner. Next, the containers or pouches are formed and filled at 22. Container formation will now be described.

During operation, the web of flexible packaging material 24 such as a thermoformable nylon film is unrolled by drawing the film upwardly over roll 26 and thence toward the right as seen in the figures beneath the heater 28. The plastic web 24 can comprise any thermoformable plastic material resistent to serious malformation, burning or other damage when exposed to the heat of an ordinary baking oven. One suitable material for use in a 350° F. baking oven is nylon film of about 0.002 inches in thickness with a heat sealable film of 0.003 inches in thickness laminated to its upper surface. The heat sealable coating can comprise a polypropylene copolymer. It is preferred that the thermoformable material be transparent so that the food can be seen inside.

After the nylon sheet material 24 is withdrawn from the stockroll and passes over roll 26 it travels beneath the heater 28 and moves horizontally at the upper surface 30 of the automatic forming and filling unit 22. The heater 28 warms the sheet material 24 sufficiently so that it can be thermoformed. This is done by drawing the sheet downwardly into the negative mold chamber 32 with the vacuum applied periodically through a pipe 33. The vacuum in this way draws the sheet downwardly into the mold 32 forming negative recesses or trays 34 each bounded on its edges by the peripheral horizontal flanges 35. After the forming of the recess or tray 34 is complete, the formed tray 34 is moved toward the right and removed. The sheet comprises a plurality of side-by-side trays 34 separated by flat horizontal flanges 35. The trays which are arranged in columns and rows running laterally and longitudinally move toward the right as seen in the drawings beneath hopper 38. The hopper 38 defines a container filling station adjacent the heater 28. Because thermoforming in the mold 32 is periodic, the sheet 24 and trays move intermittently through the automatic forming and filling unit hesitating periodically beneath the hopper 38. It is at this point that the dough loaf 36 prepared in the preceding steps is inserted into a tray through hopper 38 so that it assumes the position indicated at 40 in the center of the tray with its upper surface spaced from the top surface of the tray usually by about a ⅛ to a ¼ of an inch. The top of the dough piece should not touch the top 46 of the package or the stickiness of the dough could cause a portion of the dough to remain adhered to the package after baking. Although the motion of the sheet material 24 and the trays 34 is interrupted when the trays are being formed, the advance of the sheet and trays can be thought of as continuous. Likewise the dough bodies 36 are deposited continuously but at regular spaced intervals of time into the trays. In a typical situation, the vacuum former 32 can make 40 strokes per minute covering a web area of 46 × 42 inches to produce two dozen recesses 34 simultaneously.

After the trays 34 have been thus formed and filled with the dough pieces 36, the top 46 is applied. The top comprising the flexible thermoformable packaging film of organic resin is unwound from the roll 42 positioned above the filled trays. The lid or top 46 of each package can comprise a laminate composed for example of 0.0005 inch polyester e.g., Mylar, laminated to a layer of 0.002 inch polypropylene of the ethylene propylene copolymer type. Whatever packaging material 24 and 46 is employed, it must be able to withstand baking e.g. at temperatures 350° F. or above. Polyester film has been found satisfactory as well as polyamid films, e.g., nylon, and of these nylon laminated to thermoplastic heat sealable film is the most preferred.

From roll 42 the sheet material passes downwardly beneath a roll 44 into alignment with the upper surface of the filled trays. The upper sheet 46 or package top is then sealed to the flat portion 35 at the periphery of each recess 34 i.e., the portion between adjacent recesses, by means of the upper and lower heated sealing bars 47 and 47a respectively to form a thermoplastic seal 50 between the peripheral flange 35 and the cover 46. It can thus be seen that the sheet 46 is sealed to the portion of the first sheet 24 between the recesses 34. This forms a series of successive adjacent filled packages in side-by-side relationship.

The packages comprising the sealed trays 34 are subsequently separated from one another by means of the cutting blade 48 and stationary block 49. Blade 48 serves to cut the trays 34 apart from one another by severing the flanges 35 transversely of the web intermediate the tray recesses 34. Suitable known photoelectric or mechanical controls (not shown) can be provided for actuating the knife 48. The filled and baked packages can be cut apart from one another in any suitable way, as for example, by means of a plurality of laterally spaced side-by-side cutting blades distributed across the width of the columns and rows of packages.

When the heat sealing bars 47 are operated, the top or cover 46 is sealed as explained above at 50 around the entire periphery of each of the packages, except at the relatively narrow vent 54 shown in the FIGS. 2 and 3 which is produced by the recesses 53 of FIG. 1. The vent 54 is left unsealed so that when the packages are placed in an oven and baked, steam and gas is free to escape. This prevents the package from exploding or being misshaped during the baking operation and maintains the loaf as it bakes in an atmosphere of steam. If one vent 54 is provided, it has been found that a width of about 1½ inches from one side of the vent to the other is satisfactory for allowing the steam to escape during baking. Several vent openings 54 can be provided in each package if desired. It is not essential that the vent be in the edge or flange 35. A vent hole can be provided in the middle or top layer 42 and sealed with a patch or the like. the filled packages are next advanced to a proofing station 60 where they are proofed typically for about 50 to 70 minutes at a relative humidity of about 90 percent or above at 90° F. to 110° F. They are then baked in an oven e.g. at 350° F. until done, about 16 to 18 minutes for an 8 to 10 ounce loaf of dough. It the packages are sent through the oven in connected groups to be separated later, the laterally and longitudinally spaced slits 55 which communicate with the unsealed vents 54 to allow for the escape of steam between connected trays.

Sealing of the vent openings 54 after baking is done in either of two ways at 64. First, if the product being packaged is relatively strong such as a fairly hard roll, vienna bread or the like with a high protein content, the package can be sealed at 56 either while still in the baking oven or just as it emerges from the oven in which event a minor amount of package collapse caused by moisture condensation within the package will not unduly compress or deform the product. On the other hand, with most bakery goods which are somewhat delicate in structure such as a light loaf of white bread or delicate rolls, biscuits, cake, etc. the pressure differential caused by the condensation of moisture can adversely affect the finished shape. To prevent this, the freshly baked bread containing packages are allowed to cool before sealing and as they cool sterile air is introduced at 66 to prevent crushing which would otherwise take place during the cooling operation. Mold free air can be provided from any suitable source, e.g., by heating the air or by providing compressed air that has passed through a commercially available microfilter element having pores small enough to prevent the passage of microorganisms. The latter method is preferred because of its commercial capacity and relatively low cost. The expression, "sterile air," as used herein, means free from viable mold spores. Thus, in accordance with this form of the invention, the packages fresh from the oven are placed in a hollow metal enclosure for a short while as for example from about 1 to 5 minutes while mold free air is inspired continuously into the space surrounding them in the enclosure. As the moisture condenses within the package, a small amount of mold free air is drawn into the package through the vent 54. Immediately upon or just prior to emerging into the sterile air environment, the seal 56 is applied e.g. by means of heated sealing bars (step 64) to seal off the vent opening 54. In this way, the sterility of the package is assured and yet the package will not be crushed by the atmospheric pressure when the vapor condenses within the package. The package at this point is hermetically sealed and contains condensed steam and sterile air. The packages are next allowed to cool either in the atmosphere or by refrigeration. They are then packed in boxes and shipped. The resulting product will have a useful shelf life of 120 days or more at room temperature and if desired can be frozen, but there is no advantage in doing so since the product will keep adequately without it. Specifically, when stored at room temperature for 120 days the product will not exhibit mold growth and although a slight amount of staling occurs due to chemical deterioration, this is eliminated by warming or browning the product in an oven immediately prior to serving. Warming is usually done after removing the cover from the package.

From this description it can be seen that following proofing and resting at stage 18, the molding and forming of the dough is carried out continuously and automatically. The finished dough pieces 36 can be deposited automatically into the hoppers 38 without a requirement for manual handling. Moreover, since the web stock 24 is heated by means of the heater 28, the inner surface of tray or recess 34 is sterile when the dough 36 is introduced thereby reducing the chances for surface microbial contamination. In addition, since the packages are formed continuously in laterally extending rows and longitudinally extending columns, large volumn of production can be easily accomplished and expenses can be held to a minimum since no manual handling is necessary. It will also be noted that tops formed from layer 46 which initially comprise a single sheet are continuously automatically applied and sealed in place at 50 on the periphery of each package thereby reducing package assembly costs and eliminating the need for manually closing of the package. The upper layer 46 can also be upwardly recessed or pocketed. The pocket preferably should extend upwardly to provide additional volume for dough expansion.

Another advantage in providing columns and rows of packages connected to one another at their periphery is that large groups, for example a dozen loaves can remain connected together throughout the entire proofing and baking operation. For example, the knife 48 ca be made to operate to provide a transverse cut between every second laterally extending row of trays in FIG. 4. This will produce a group of a dozen loaves that travel through the proofer and oven as a unit. The final serving operation can be carried out simultaneously with the sealing step at 64. Proofing and baking or packages in connected groups reduces the possibility of damage and makes it easier for the packages to be carried from one stage of the process to the next.

It will thus be seen that the invention is useful in connection with a variety of foods such as baked goods and for both yeast and chemically leavened bread and rolls and no chemical preservatives are required for mold free storage. They can however be used to prevent rope if rope is ever a problem. To prevent the growth of *Clostridium botulinum,* foods are preferably formulated to have an $a_w$ of 0.94 or below.

It should be noted that the trays 34 are filled with dough immediately downstream from where tray forming is accomplished. It can also be seen that the trays are filled before being cut apart and the predetermined position of each tray enables each of the trays to be located precisely below a hopper so that the hopper will function to accurately guide the dough into the center of the tray.

While the baked end product can be consumed without further preparation it is preferred to heat it just prior to being served.

What is claimed is:

1. A process of baking foods in flexible containers comprising providing a flexible package that is a barrier to microorganisms and is capable of withstanding baking temperatures, placing the farinaceous food product in the package, sealing the package to provide a filled package, maintaining a vent opening in said flexible package to allow the escape of steam and gas during baking, plaing the package in a baking oven and exposing it to heat for a sufficient period of time to bake or to cook the food product and generate steam to fill the space within the package, excess steam being allowed to escape through the vent opening, providing a source of sterile air free from viable mold spores, allowing said package to cool and inspire said sterile air through the vent opening as steam within said package condenses, the amount of sterile air inspired being in an amount sufficient to prevent the package from being crushed by the atmospheric pressure when the vapor condenses within the package, thereafter sealing the vent opening to completely seal the package to contain said condensed moisture generated during baking and the inspired sterile air whereby a package of bakery goods is provided which is free from mold for a period of 120 days storage at room temperature.

2. The process of claim 1 wherein the bakery product is proofed after the package is filled and prior to baking.

3. The process of claim 1 wherein after the package is closed and after baking but prior to sealing the vent, the package is allowed to inspire said sterile air through the vent opening and the vent opening is thereafter hermetically sealed to provide a hermetically sealed package containing condensed steam and sterile air.

4. The process of claim 1 wherein the package is a tray having a peripheral flange, said food is placed in the tray and a cover sheet is applied to the flange and sealed thereto but prior to sealing the vent, the package is allowed in inspire sterile air through the vent opening and the vent opening is thereafter hermetically sealed to provide a hermetically sealed package containing sterile air.

5. The process of claim 1 wherein said package is a flexible sheet with a peripheral flange and a sheet of flexible packaging material is sealed to the flexible sheet around the entire peripheral flange except in a predetermined area where the sheets remain unsealed to one another to define said vent opening comprising the unsealed area between the flexible sheet and the flexible packaging material.

6. The process of claim 5 wherein after the package is closed and after baking but prior to sealing the vent the package is allowed to inspire sterile air through the vent opening and the vent opening is thereafter hermetically sealed to provide a hermetically sealed package containing sterile air.

* * * * *